United States Patent [19]

Maerfeld et al.

[11] Patent Number: 5,022,731
[45] Date of Patent: Jun. 11, 1991

[54] DEVICE FOR OPTICAL FREQUENCY TRANSLATION AND A MODULATOR IN WHICH SAID DEVICE IS EMPLOYED

[75] Inventors: Charles Maerfeld, Antibes; Bernard Desormiere, Vence, both of France

[73] Assignee: Thomson-CSF, Puteaux, France

[21] Appl. No.: 448,982

[22] Filed: Dec. 12, 1989

[30] Foreign Application Priority Data

Dec. 16, 1988 [FR] France .................................. 88 16617

[51] Int. Cl.$^5$ .............................................. G02B 6/10
[52] U.S. Cl. ................................................ 350/96.14
[58] Field of Search ................ 350/96.12, 96.13, 96.14

[56] References Cited

U.S. PATENT DOCUMENTS

| | | | |
|---|---|---|---|
| 4,761,049 | 8/1988 | Burns et al. | 350/96.14 |
| 4,871,223 | 10/1989 | Auracher et al. | 350/96.14 |
| 4,932,738 | 6/1990 | Haas et al. | 350/96.14 |
| 4,940,305 | 7/1990 | Thaniyavarn | 350/96.14 |

FOREIGN PATENT DOCUMENTS 211113 2/1987 European Pat. Off. .
2190512 11/1987 United Kingdom .

OTHER PUBLICATIONS

Proccedings of the IEEE 1987 Ultrasonics Symposium, Denver, Colo., Oct. 14–16, 1987, vol. 1, pp. 471–474, IEEE, New York, U.S., Y. Miyazaki, et al., "Integrated Optical Signal Processors Consisting of Collinear Acousto-Optic Switches".

Applied Physics Letter, vol. 4, No. 5, Sep. 1, 1984, pp. 490–492, American Institute of Physics, New York, U.S.; F. Heismann, et al.: "Integrated-Optical Frequency Translator with Stripe Waveguide".

Primary Examiner—William L. Sikes
Assistant Examiner—Robert E. Wise
Attorney, Agent, or Firm—Oblon, Spivak, McClelland, Maier & Neustadt

[57] ABSTRACT

In a device for shifting the frequency of an optical wave, two optical waveguides coupled by an optical wave which propagates in the symmetric mode are excited and subjected to the action of an electromagnetic traveling wave having the effect of shifting the frequency of the optical wave which undergoes a transition from the symmetric mode to the antisymmetric mode. A transfer device supplied with a direct-current voltage $V_O$ serves to re-convert the antisymmetric mode to the symmetric mode in order to add the two light signals and to obtain a single output signal translated by the frequency F. This permits the construction of BLU optical modulators.

9 Claims, 5 Drawing Sheets

FIG_1

FIG_2

FIG_3

FIG_4

FIG_5

FIG_6

FIG_10

FIG_11

FIG_12

FIG_13

FIG_8

DEVICE FOR OPTICAL FREQUENCY TRANSLATION AND A MODULATOR IN WHICH SAID DEVICE IS EMPLOYED

BACKGROUND OF THE INVENTION

1. Field of the Invention

The present invention relates to devices which serve to modify the frequency of a light wave. The invention is also concerned with modulators which make use of a device of this type for modulating a light wave employed as a carrier wave.

2. Description of the Prior Art

Figure 1:
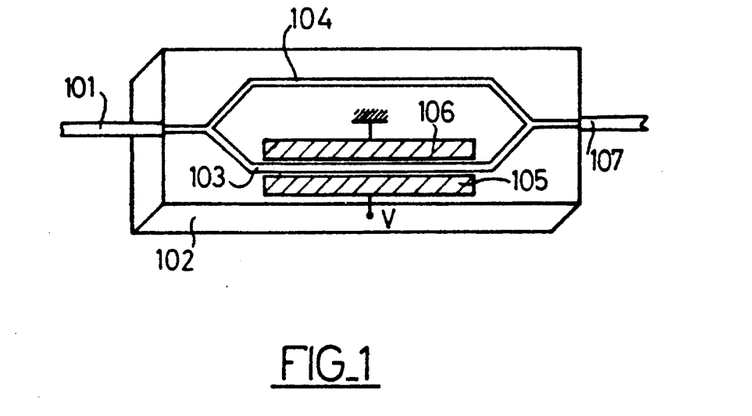
FIGS. 1 and 2 show electrooptical modulators in accordance with the prior art.

Electrooptical modulators constructed in integrated optics are already known which permit amplitude modulation of a light signal by means of a modulating electric signal. In a modulator of this type as shown diagrammatically in FIG. 1, the light signal to be modulated arrives through a fiber 101 on an optical circuit which is integrated on the surface of a substrate 102. This optical circuit includes an interferometer of the Mach-Zehnder type having two arms 103 and 104 in which the light signal is shared. Two electrodes 105 and 106 extend over the surface of the substrate along one of the arms of the interferometer. The modulating electric signal V is applied to the supply terminals of said electrodes. The substrate being formed of electrooptical material such as lithium niobate, for example, the refractive index of the arm surrounded by the electrodes varies by Pockels effect. Thus at the point of junction of the two arms, the signal which has passed through the arm subjected to the action of the electrodes is phase-shifted with respect to the signal which has passed through the other arm and the intensity of the signal resulting from the sum of these two signals depends on the value of said phase shift. There is thus obtained an amplitude modulation of the optical intensity of the signal at the output of the integrated circuit. This signal then passes to an output optical fiber 107 for subsequent use in the desired manner.

Figure 2:
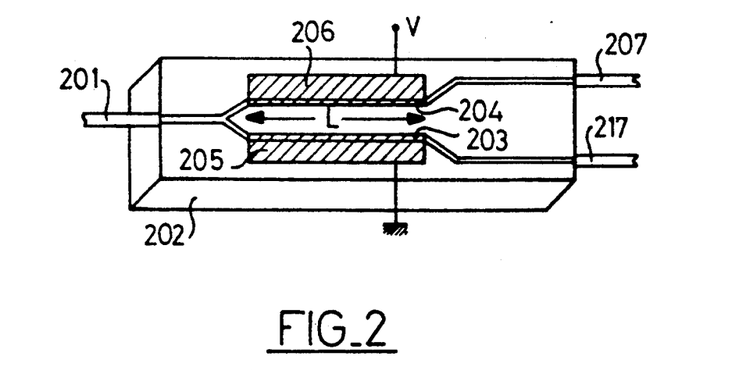
Figure 3:
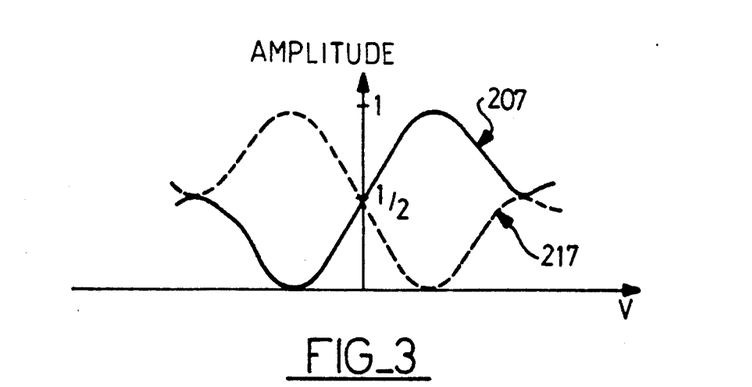
FIG. 3 shows curves of signals in the modulator of FIG. 2.

It is also known to make use of optical amplitude modulators as shown in FIG. 2, in which the optical signal also arrives through an input fiber 201 on an integrated circuit at the surface of an electro-optical substrate 202. In these modulators, the optical signal is again distributed in two waveguides 204 and 203 but these latter are more closely spaced over a length L, at a distance equal to a few wavelengths. An optical coupling is accordingly obtained over this distance between the waveguides. These guides are then spaced farther apart so as to be no longer coupled and they excite two output fibers 207 and 217. Two electrodes 205 and 206 extend respectively along the two arms 203 and 204 and cover these latter. This makes it possible to modify the optical indices of these waveguides by electrooptical effect when a voltage V is applied to the terminals of the connections which supply the electrodes. In an assembly of this type, the refractive index of one of the waveguides increases whilst the index of the other waveguide decreases and vice versa as a function of the polarity of the applied voltage. In the case of this device, known as a "Y coupler", one defines a characteristic length of coupling between the two waveguides, designated as $L_c$, which is shorter as the coupling is stronger. If the length L of the coupler is such that $L = L_c\sqrt{2}$, there is obtained on the output fibers 207 and 217 a light intensity which varies approximately sinusoidally as a function of the voltage V, as shown in the graph of FIG. 3. If the voltage V is then caused to vary so as to remain in the central, substantially rectilinear portion of this graph, the light applied by the input fiber 201 can therefore be modulated in amplitude. The output signals on the output fibers 207 and 217 are complementary to each other.

It should be pointed out that these devices permit only amplitude modulation without modifying the frequency of the light signals. There are obtained in this case symmetrical side-bands due to the modulation, which in no way corresponds to a frequency translation.

In 1987 Ultrasonics Symposium published in the IEEE review under the reference 0090-5607/87/-0000-0471, Yasumitsu Miyazaki and Nobuo Goto proposed an acoustooptical device for selectively switching optical signals as a function of the frequency. This device makes it possible to obtain a certain optical translation effect which produces the equivalent of a BLU modulation. This device, however, in which frequency translation is obtained by modulation of the refractive index under the action of acoustic waves, is limited in frequency and its construction involves a technology which is difficult to apply in practice.

SUMMARY OF THE INVENTION

In order to obtain a true optical translation, the invention proposes a device for optical translation of optical frequency which comprises a substrate of electrooptical material on which are integrated two optical transmission waveguides in substantially parallel relation over a length $L_1$ and spaced at a distance $d_1$ and at least two electrodes extending along the waveguides over the distance $L_1$ so as to form a microwave propagation line which is closed on a characteristic impedance and which can be supplied by a microwave signal at the frequency F, the values of $L_1$, $d_1$ and F being such as to permit a transition of the transmitted optical wave from the symmetric mode to the antisymmetric mode with a frequency translation of the optical wave in the antisymmetric mode by a value equal to F, and means for subsequently converting the antisymmetric mode to the symmetric mode in order to be able to obtain at the output an optical signal which is frequency-shifted by the frequency F.

DESCRIPTION OF THE PREFERRED EMBODIMENTS

Figure 4:
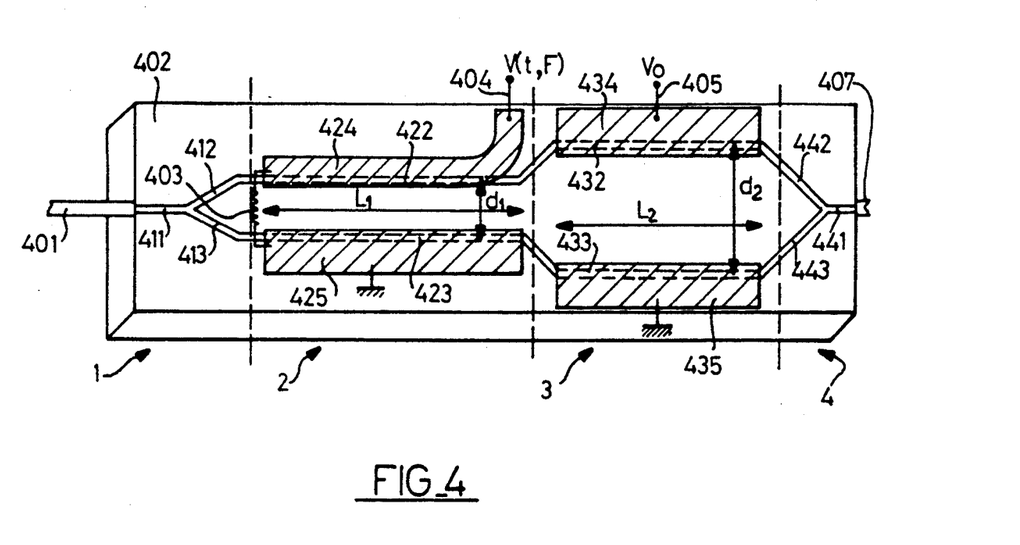
FIG. 4 shows a modulator in accordance with the invention.

The device in accordance with the invention as shown in FIG. 4 includes a substrate 102 of electro-optical material such as lithium niobate, for example. An optical circuit and control electrodes are integrated on the surface of said substrate. These integrated elements can be divided into four principal sections numbered from 1 to 4 and corresponding to the same number of distinct functions.

Section 1 comprises a symmetrical input junction formed by an optical waveguide 411 which is divided into two arms 412 and 413. This symmetrical junction serves to distribute in an equal manner within the two arms 412 and 413 the incident optical flux which arrives through the input optical fiber 401, said fiber being in turn coupled to the waveguide 411.

Section 2 comprises two optical waveguides 422 and 423 which are parallel over a distance $L_1$ and spaced at a distance $d_1$. The arms 412 and 413 of the input junction are connected to the waveguides 422 and 423, thus making it possible to excite the symmetric mode of the structure formed by these two waveguides. It is in fact known that two intrinsic modes, namely the symmetric mode and the antisymmetric mode, are capable of propagating within a structure of this type. In the absence of other phenomena, in particular of dissymmetries and of electrooptical effects, only the symmetric mode propagates without exciting the antisymmetric mode.

Two conducting electrodes 424 and 425 of metal, for example, extend above the two waveguides 422 and 423 along the distance $L_1$. These electrodes are in the form of strips in which the width, thickness and spacing distance are such that they form an electrical propagation line having a predetermined characteristic impedance of 50 ohms, for example. This line is closed at one end, namely the end at which the optical energy arrives in the waveguides of the figure, on a resistor 403 whose value is equal to that of the characteristic impedance of the line. Said line is excited at the other end by a voltage V(t,F) which, in this example of construction, is applied through a connection 404 to one of the electrodes and through ground to the other electrode.

Under the action of the voltage thus applied and of the electrooptical effect induced in the substrate by said voltage, a coupling between the two modes takes place along the waveguides. This coupling results in a transfer of energy from the symmetric mode to the antisymmetric mode, which is more or less marked according to the length of interaction and the value of the voltage.

In accordance with the invention, the two electrodes 424 and 425 which are closed on their characteristic impedance 403 form a propagation line in which is developed a traveling wave excited by the voltage V(t,F) whose frequency is preferably high, of the order of 10 GHz, for example. This travelling wave can be a backward wave as in the example shown (which means that the electromagnetic wave travels in the direction opposite to the light wave) or a forward wave when the positions of the output impedance and of the supply connections are interchanged.

In accordance with the invention, mode conversion is accompanied by an optical frequency translation equal to the frequency of the electromagnetic wave. At the output of the two waveguides 422 and 423 which recede from each other at the end of the distance $L_1$ so that there is no longer any coupling from this distance onwards, there are consequently obtained light waves which are frequency-shifted with respect to the incident wave and phase-shifted with respect to each other, this phase shift being equal to $\pi$ if the conversion from the symmetric mode to the antisymmetric mode is complete.

These two outputs are connected in section 3 to two optical waveguides 432 and 433 which are parallel to each other over a distance $L_2$ and spaced at a distance $d_2$ which is sufficient to ensure that these waveguides are not coupled to each other.

Two electrodes 434 and 435 extend over the entire length of these waveguides. A direct-current voltage $V_O$ is applied to these electrodes by means of a connection 405 connected to one of the electrodes and by means of a connection between ground and the other electrode. In this manner, the refractive index of the substrate varies in opposite directions at the level of the waveguides so as to obtain between the two light waves which propagate respectively within each waveguide a phase shift which compensates for the phase shift existing between these two light waves at the output of section 2 as a result of the transition from the symmetric mode to the antisymmetric mode.

The outputs of the waveguides 432 and 433 are connected in section 4 to two arms 442 and 443 which converge at a common point so as to form an exit guide 441. This section, which is a symmetrical output junction similar to the junction 1 but operating in the opposite direction serves to form the sum of the light waves which have traveled separately within sections 2 and 3 and which have been re-phased at the output of section 3.

An optical fiber 407 serves to collect the light energy which passes out of the waveguide 441 and to apply it to the utilization circuits.

It is pointed out that, in the example of construction thus described, the polarization is identical within the two waveguides and can be either TM or TE according to the crystal orientation of the substrate 402 and the geometry of the electrodes.

As soon as there is a traveling wave along the electromagnetic line which produces a finite coupling, this results in more or less complete conversion of the symmetric mode to the antisymmetric mode and therefore in the appearance of a frequency translation on the antisymmetric light wave. The efficiency of the device is clearly higher as the conversion is more complete and is at a maximum when the symmetric mode at the exit of section 2 has disappeared, thus leaving only the antisymmetric mode.

This occurs when there is a spatially stationary interaction in section 2 involving cancellation of the spatial dependence of the coupling of the two modes as a function of the distance.

This condition is expressed by a relation between the propagation constants, or wave numbers $2\pi\lambda$, *of the three waves which are present*:

the optical wave in the symmetric mode, the wave number of which is $\beta_s$;

the optical wave in the antisymmetric mode in the absence of an electromagnetic wave, the wave number of which is $\beta_a$;

the electromagnetic wave whose wave number is B.

This relation is written as follows, the + sign being adopted if the electromagnetic wave is a backward wave and the - sign being adopted if it is a forward wave :

$$\beta_s - \beta_a^\pm - B = 0 \text{ or } \beta_a^\pm = \frac{\omega \pm \Omega}{\omega} \beta_a$$

In this formula, the frequency $\nu$ of the incident optical wave is given by $\omega = 2\pi\nu$ and the frequency F of the electromagnetic wave is given by $\Omega = 2\pi F$.

Figure 5:
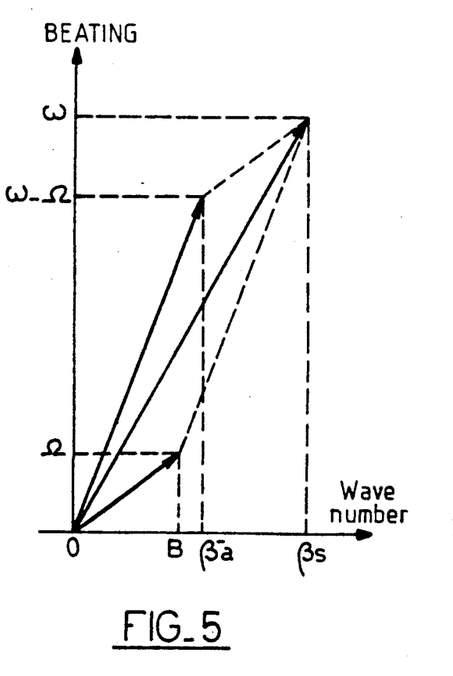
FIGS. 5 and 6 are graphs of wave number in section 2 of the modulator of FIG. 4.
Figure 6:
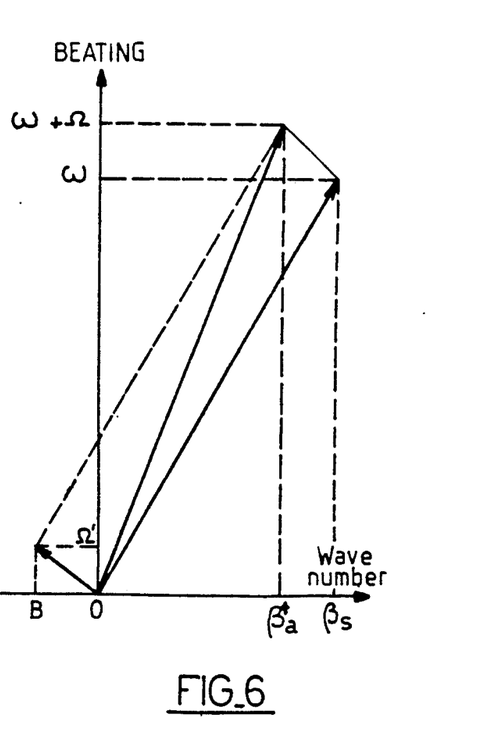

This condition is represented vectorially in FIGS. 5 and 6 in which FIG. 5 corresponds to a forward wave and FIG. 6 corresponds to a backward wave.

The wave numbers $\beta_s$ and $\beta_a$ are obtained from the wave number $\beta$ which is that of the light wave in the absence of optical coupling.

In the presence of optical coupling, we have $\beta_s = \beta + k$ and $\beta_a = \beta - k$. *k is a coupling parameter which virtually expresses the "force" of coupling between the two waveguides. This parameter k is a function of the distance $d_1$* between the waveguides and is proportional as a first approximation to $$\exp\left[\frac{-d_1}{d_0}\right]$$

where $d_0$ is determined in known manner by the characteristics of the waveguides.

It is therefore deduced from these relations that $\beta_s - \beta_a = 2k$.

It is also shown that the coupling length $L_c$ mentioned earlier is written: $L_c = {}^9 0 2k$ It is therefore apparent that the coupling length corresponds to a spatial phase shift of $\pi$ between the two modes since $(\beta_s - \beta_a) L_{c=\pi}$.

By expressing the wave numbers as a function of the frequency and of the wave velocity in the medium considered, the equality observed earlier is written ($c_O$ being the velocity of the electromagnetic waves in a vacuum, n being the refractive index of the non-guided optical waves in the medium considered and N being the equivalent refractive index of the microwave in the waveguide):

$$F = \frac{c_O \, k(d_1)}{\pi (N \pm n)}$$

In this formula, $+$ is for the backward wave and $-$ is for the forward wave.

This formula therefore makes it possible to determine either the distance $d_1$ between the waveguides of section 2 in order to obtain a translation of frequency F or the translation of frequency F which can be obtained in the case of a predetermined structure in which the value of $d_1$ is also predetermined.

In the last-mentioned case in which the structure is predetermined, it is found that the frequency F, and therefore the angular frequency $\Omega$, are lower in the case of a backward wave than in the case of a forward wave.

By way of numerical example, in the case of a Z-cut lithium niobate substrate with propagation in the TM mode, we have $n = 2.12$ and $N = 4.25$. In the case of a frequency $f = 10$ GHz, the interval which is necessary between the internal edges of the two waveguides is approximately 3 micrometers, this value being wholly achievable by means of current technologies.

The light energy is distributed at the output of both section 2 and section 3 between the symmetric and antisymmetric modes and only the antisymmetric mode has been subjected to a frequency translation. In order to obtain maximum efficiency, it is therefore desirable to ensure that conversion of the symmetric mode to the antisymmetric mode is as complete as possible both in section 2 and in section 3. When this conversion is complete, it is said that there is total transfer between the modes.

In order to achieve total transfer, the phase shift between the input and the output of each of these sections is in practice equal to $\pi$, taking into account the dimensions obtained.

The phase shift along each section is equal to $$\frac{2\pi}{\lambda} \Delta n \, L = \beta \, \Delta n \, L$$

where L is the length of interaction, that is to say $L_1$ or $L_2$, and n is the variation in optical index of the substrate material under the action of the electric field applied by the electrodes.

In the example shown in which the two electrodes are superposed on the two waveguides, the electric field is vertical and designated as $E_3$ in accordance with current notations. The value of n is accordingly given by the known relation $\Delta n = n^3 R_{33} E_3 A$ in which $R_{33}$ is the electrooptical coefficient employed, especially as a function of the crystal orientation, and A is a coefficient representing the standardized integral of the flux of the product of the optical and electromagnetic fields through a transverse section in the case of a non-coupled single waveguide.

It is therefore observed that the condition of total transfer involves the two parameters L and $E_3$. The value of $E_3$ is determined in the case of section 2 by the peak amplitude of the electric field produced by the signal V(t,f) and in the case of section 3 by the value of the constant voltage $V_O$. It is clear that if the values of these two fields are made equal, the lengths $L_1$ and $L_2$ will be equal.

By way of numerical example, in the case of a field $E_3 = 10^5 V/m$, a coefficient $A = 1$, an index $n = 2.12$, a coefficient $R_{33} = 30 \times 10^{-12}$ m/V and a wave number $\beta = 2 \times 10^6$ rd/m, the length L is equal to 3 cm, this value being wholly attainable by means of current technologies.

As will be readily understood, the signal at the output is at a maximum level at a predetermined frequency F when the two conditions stated above (condition of stationarity and condition of total transfer) are satisfied. When the frequency F varies, for example because it is modulated in any way, the signal level falls, thus determining, as in the case of any device, a passband $\Delta F$.

The passband at mid-height is given by the formula:

$$\Delta F = 0.8 \frac{c_O}{(N \pm n) L}$$

In the numerical example corresponding to the values given above, 3.7 GHz are obtained in the case of a backward wave.

In the example of construction thus described, section 3 produces a phase shift of $\pi$ between the optical waves which travel along the two waveguides 432 and 433.

In an alternative embodiment, a spatial separation of the symmetric and antisymmetric modes is carried out.

Figure 7:
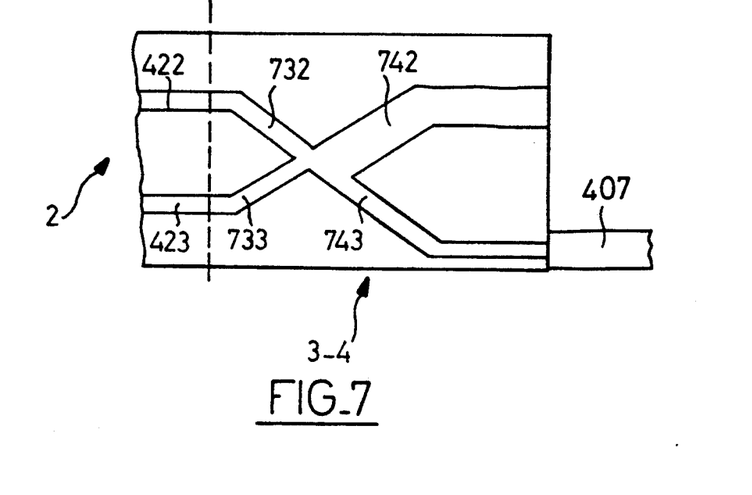
FIGS. 7 to 11 show alternative forms of construction of modulators in accordance with the invention.

To this end, there is employed an asymmetric junction having two outputs of different width in which the symmetric mode emerges from the waveguide of greater width. Sections 3 and 4 of this device are shown in FIG. 7. The integrated optical waveguides 732 and 733 which are connected to the integrated waveguides 422 and 423 of section 2 converge so as to meet and then diverge again in the form of waveguides 742 and 743 with which they form an X. The leg 742 of said X is of greater width than the leg 743. The antisymmetric mode passes out of this narrow leg 743 in known manner and is collected by the output optical fiber 407.

Another means consists in modifying the fabrication of the optical waveguides. These latter are usually formed by diffusion of a material such as titanium on the surface of the substrate. The phase shift of section 3 can accordingly be obtained by modifying the thickness of the layer of titanium or its width. Similarly, it is possible to employ a dielectric layer deposited on the surface of the substrate, on one of the waveguides or in immediate proximity to this latter since it is known that a layer of this type modifies the parameters of the waveguide. It is then an easy matter to adjust these parameters by carrying out selective removal of this layer, with a laser, for example.

Figure 9:
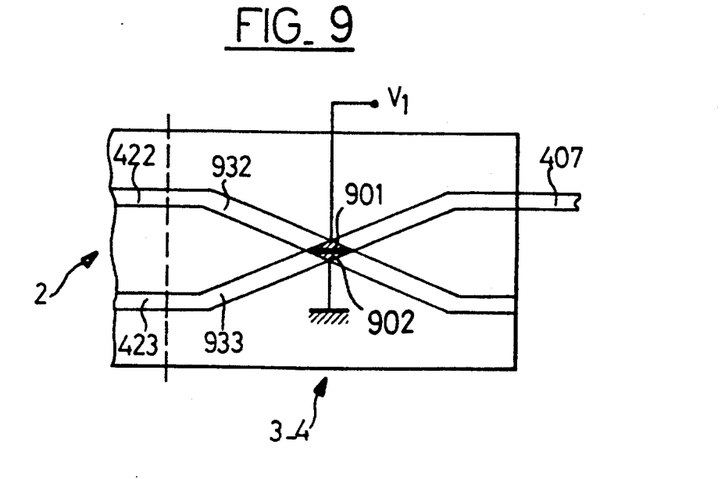

It is also possible to employ a device known as an X switch. In this device, as shown in FIG. 9, the waveguides 932 and 933 which are joined to the guides 422 and 423, are crossed at a point 901. Electrodes 901 and 902 connected in one case to ground and in the other case to a control voltage $V_1$ are placed above and beneath said crossover point. Under these conditions, and in respect of an adequate value of $V_1$ determined in known manner, the symmetric mode emerges from only one of these waveguides and is collected by the output optical fiber 407.

Figure 10:
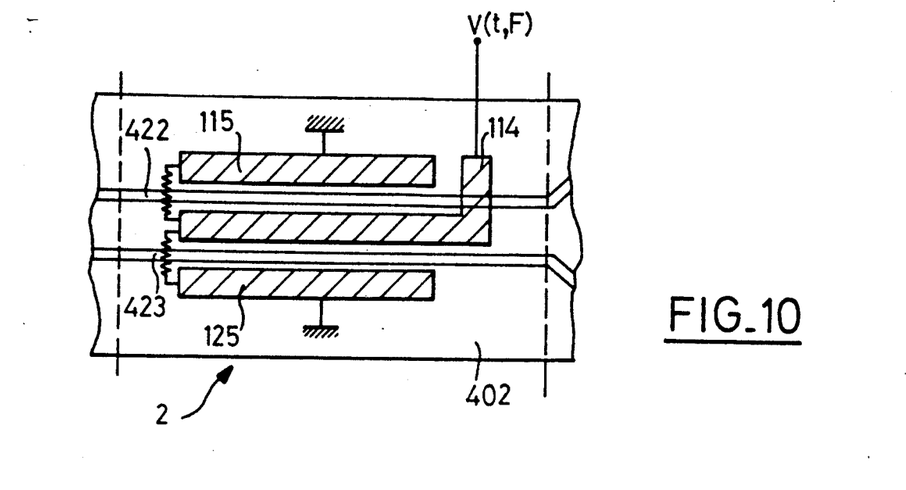

All the modes of construction described in the foregoing corresponded to a Z-cut of the electro-optical crystal, that is, to a cut in which the axis C is perpendicular to the surface, and to a TM mode of propagation of the optical wave, that is, a mode in which the electric field is perpendicular to said surface. This makes it possible to employ the electrooptical coefficient $R_{33}$ having the highest value. Other combinations of crystal cuts and of modes of transmission of the optical wave can be employed, which make it possible in some instances to employ the same coefficient $R_{33}$. This is the case in particular for an X-cut or a Y-cut and a TE mode. In order to produce action on this TE mode, the electric field must necessarily be applied horizontally with respect to the crystal surface by employing three electrodes, for example, as in FIG. 10. In this figure, which shows only the central section 2, the control electrode 114 connected to the voltage V(t,F) is located between the two waveguides 422 and 423 and there are two electrodes 115 and 125 connected to ground and located on each side of these two waveguides 422 and 423, thus making it possible to obtain at the level of the guides an electric field parallel to the surface of the substrate 402 at the same level of the guides.

Figure 11:
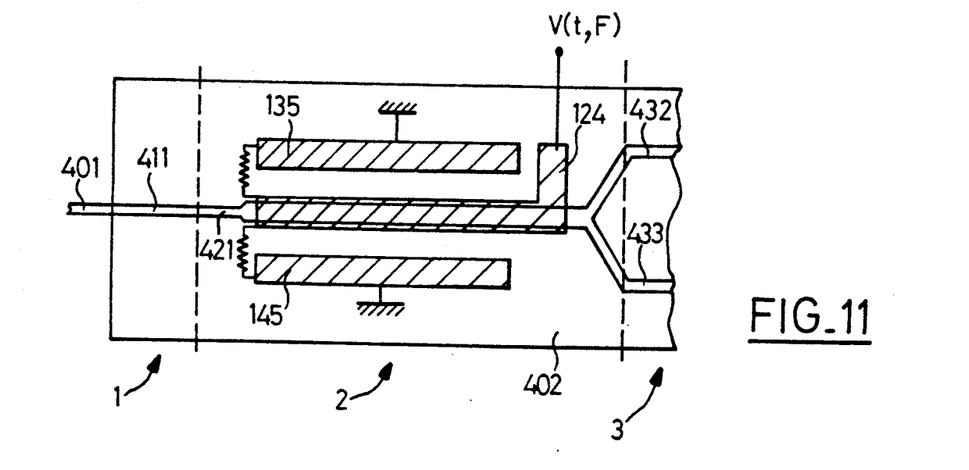

It is possible in another alternative embodiment to employ a single waveguide in section 2, as shown in FIG. 11. It is in fact known to operate an optical waveguide in the bimode, that is, with both modes which propagate simultaneously and separately within said waveguide. A symmetric/antisymmetric transition between the two propagation modes can in that case be obtained by electrooptical effect, thus making it possible to obtain a frequency translation by satisfying the conditions which have been noted earlier.

As shown in FIG. 11, there is accordingly employed a single waveguide 421 which is excited directly by a single waveguide 411 of section 1, said single guide being in turn supplied by an input optical fiber 401. In fact, section 1 is reduced to its simplest expression. In order to apply the microwave signal, there is employed a single central electrode 124 which extends over the surface of the guide and which is supplied by the signal V(t,F). In order to ensure that the electric field is in fact applied symmetrically to the guide, two electrodes 135 and 145 connected to ground surround the central electrode 124. This arrangement should be clearly distinguished from that of FIG. 10 which bears a resemblance to this latter in that the guide 421 in fact passes beneath the electrode 124 and that the field applied to this guide is in fact perpendicular to the surface of the substrate 402, the presence of the two electrodes 135 and 145 being intended simply to ensure symmetry of said field whereas, in field 10, the guides 422 and 423 are not covered by the electrodes and the electric field here is in fact horizontal.

The waveguide 421 at the exit of section 2 is in this case divided into two branches for supplying the waveguides 432 and 433 of section 3.

In such a case, the operating frequency F is fixed since the distance d is intrinsic to the waveguide which is a single guide. Since this distance d is very small, the value of the coefficient k is very high and the same applies to the frequency F.

This frequency can be adjusted by modifying different parameters of construction of the waveguide as has been seen earlier and especially by adopting the known technique of proton exchange.

Another embodiment of a bimode single waveguide consists in employing the two TE and TM modes simultaneously. Within the waveguide, there is a progressive electrooptical coupling between the TE and TM modes. The stationarity relation is written $\beta^{30}{}_{TE}-\beta_{TM}=0$. The difference in refractive indices corresponding to the TE, TM modes is too great and, in order to vary the indices, two techniques are combined, namely titanium diffusion and proton exchange, thereby ensuring that the stationarity relation is satisfied at the desired frequency.

This technique is described in particular in an article published by M. de Micheli et al. in "Optics Communication", vol. 42, No. 2, pages 101-103, June 15th, 1982 and entitled "Fabrication and characterization of titanium in diffused proton exchanged (TIPE) waveguides in lithium niobate".

Figure 12:
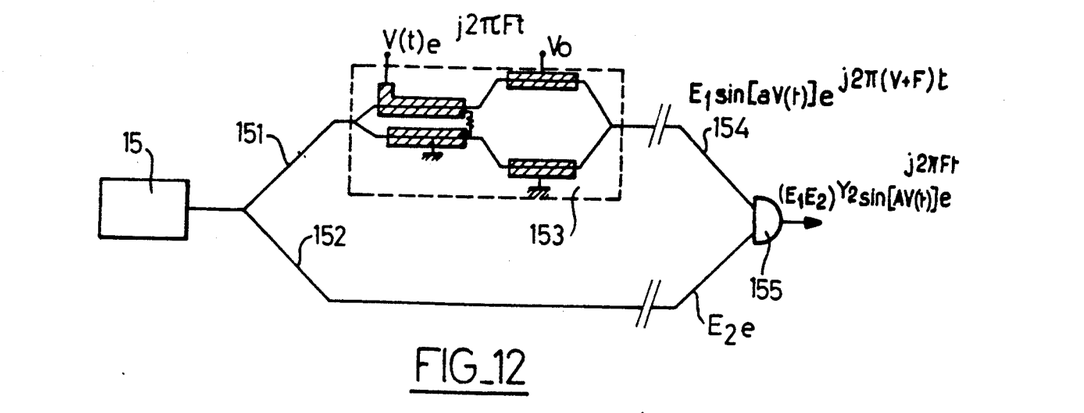
FIG. 12 is a diagram of an optical connection which makes use of a modulator in accordance with the invention.

A modulation device as described in the foregoing makes it possible for example to transmit a signal V(t) by heterodyning between two optical signals as shown in FIG. 12. To this end, there is employed a laser source 150 which emits a substantially monochromatic light signal $E_O$ at the frequency ν. This signal is divided into two in order to excite two optical fibers 151 and 152 in equal manner. The optical fiber 151 is connected to a modulator 153 in accordance with the invention which receives a modulation signal $V(t)e^{j2\pi t}$. The signal thus modulated is transferred to an output optical fiber 154 and passed by this latter to a reception photodiode 155. This photodiode also receives the signal derived from the optical fiber 152, which forms a reference signal and beats with the signal which is frequency-shifted in the modulator 153. The electric signal at the output of the diode 155 is therefore proportional to the modulation V(t).

One advantage of this transmission device is that the useful signal which propagates in the fiber 154 is located outside the principal ray of the laser source since the modulation frequency F is greater than the bandwidth B of the laser oscillator by reason of the fact that the optical frequency translation is substantial in accordance with the invention.

A modulator of this type can also be employed for optical distribution of microwave oscillators in electronic-scanning radar antennas or for constructing a bank of channels displaced in frequency from a single laser in order to provide coherent systems with frequency multiplexing in the optical-fiber transmissions which are employed in very-high-capacity networks.

It is also to be noted that a frequency translation of this type in fact corresponds to a modulation of the BLU type. This device can therefore be considered as a modulator of the BLU type which offers particularly high performance since the frequency difference can attain 10 GHz.

Figure 13:
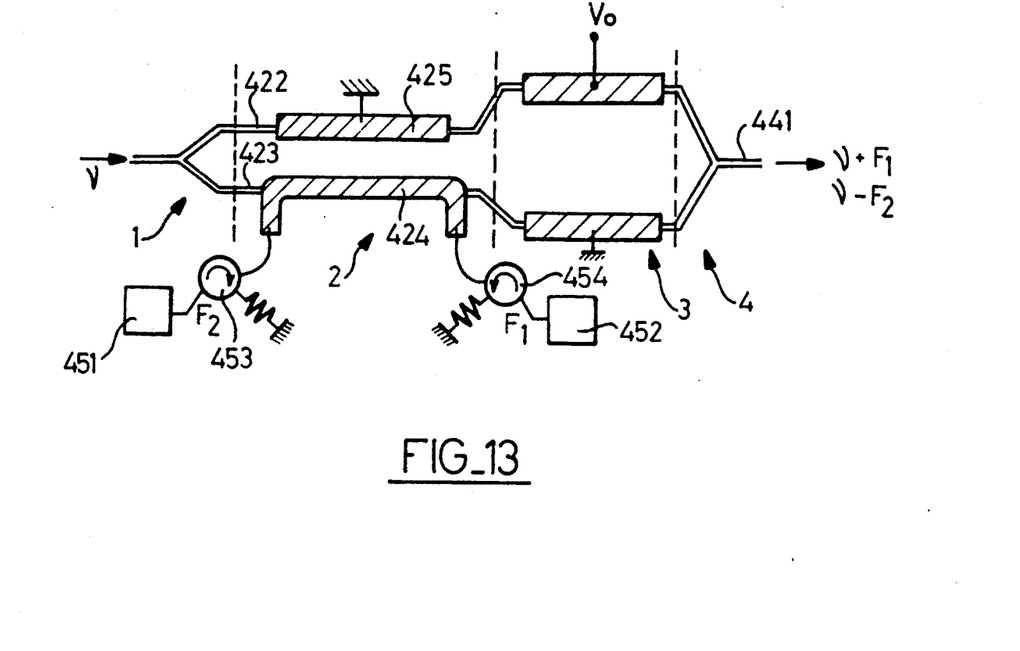
FIG. 13 shows a double modulator in accordance with the invention.

In another alternative embodiment shown diagrammatically in FIG. 13, the electrode 424 is supplied by two microwave oscillators 451 and 452 connected respectively through circulators 453 and 454 to both ends of said electrode. Since the translation frequency is different according to the direction of propagation of the electromagnetic wave with respect to the electro-optical wave, it is therefore possible to employ for one of the microwave generators a frequency $F_1$ corresponding to the backward wave and for the other a frequency $F_2$ corresponding to the forward wave. Two light waves are thus obtained at the output, one wave being at the frequency $\nu + F_1$ and the other wave being at the frequency $\nu - F_2$. The frequency shift ratio is equal to $$\frac{N+n}{N-n}$$

and, in the numerical examples described earlier, is substantially equal to 3. However, this ratio can be reduced by employing for the substrate a stratified structure made up, for example, of a thinned layer of niobate deposited on $SiO_2$, thus reducing the refractive index N.

A device of this type makes it possible to transmit two oscillators with a single device or two channels in FDM-BLU. The two translations can also be sequenced in time so as to produce coherent echometry by beating the two echoes together after they have been reset in coincidence in time by means of a differential propagation delay. The advantage accordingly offered by this device is that of having a very high relative passband.

Figure 8:
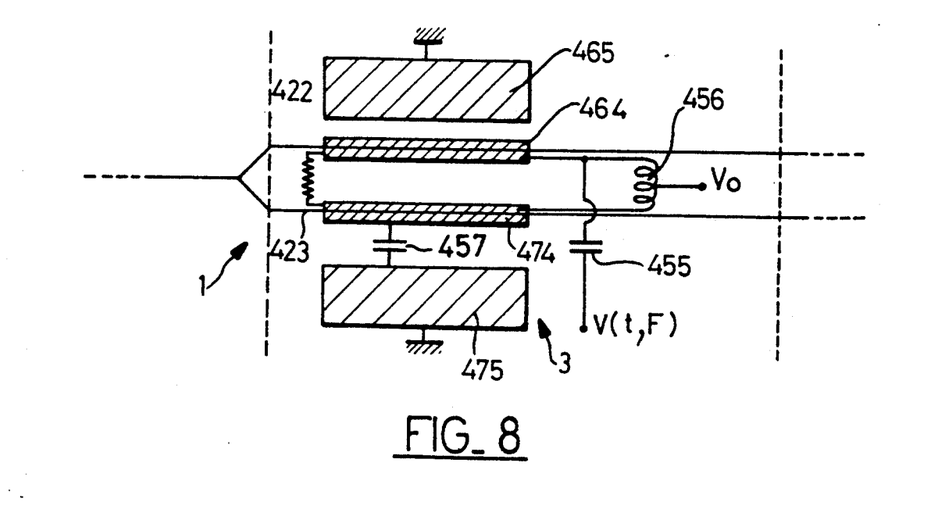

It is also possible to frequency-tune the device in accordance with the invention by employing the alternative embodiment illustrated in FIG. 8.

In this variant, the waveguides 422 and 423 are covered respectively by separate electrodes 464 and 474 and two electrodes 465 and 475 connected to ground extend on each side of these central electrodes. The central electrodes 464 and 474 are supplied with a voltage $V_O$ by means of a stopping inductance coil 456 which serves to prevent the passage of microwave signals which are applied as will be seen below.

Accordingly, by causing $V_O$ to vary, one varies the coupling parameter k between the two waveguides and therefore the operating frequency.

The translation microwave signal V(t,F) is then applied to the electrode 464 by means of a coupling capacitor 455 which serves to prevent short-circuiting of the direct-current voltage $V_O$. The stopping inductance coil 456 makes it possible to prevent the microwave voltage from being sent to the direct-current voltage generator. A capacitor 457 serves to connect the electrode 474 to ground from an alternating-current standpoint.

The modulators in accordance with the invention as thus described in their different variants have the principal advantage of having a single sideband, thus avoiding the disadvantages arising from the image frequency of the known optical modulators which have a double band.

Moreover, in the field of guided optics, these devices are the only ones which permit efficient translation of a very high frequency, especially in the microwave field.

What is claimed is:

1. A device for optical translation of optical frequency, comprising:
    a substrate of electrooptical material;
    two optical transmission waveguides integrated on said substrate, said two optical transmission waveguides being in substantially parallel relationship over a length $L_1$ and spaced from each other at a distance $d_1$;
    at least two electrodes extending along said waveguides over the distance $L_1$, forming a microwave propagation line;
    a characteristic impedance which closes said microwave propagation line;
    a microwave signal having a frequency F supplied to said microwave propagation line;
    said microwave propagation line converting the symmetric mode of a transmitted optical wave to the antisymmetric mode with a frequency translation in the antisymmetric mode of F; and
    means for converting the antisymmetric mode to the symmetric mode to produce ann optical signal which is frequency-shifted by the frequency F.

2. A device according to claim 1 and having only two electrodes which extend above the waveguides over the distance $L_1$ in order to apply to said waveguides an electric field perpendicular to the surface of the substrate.

3. A device according to claim 1 and having three electrodes, one electrode being placed on the surface of the substrate between the two waveguides and the other two electrodes being located respectively on each side of the two waveguides in order to apply a transverse electric field to said waveguides.

4. A device according to claim 1, wherein the two waveguides are combined in a single waveguide which operates in a bimode and which comprises a central electrode deposited on said bimode waveguide and two lateral electrodes deposited on each side of said waveguide in order to apply to the waveguide an electric field perpendicular to the surface of the substrate which makes it possible to obtain a symmetric/antisymmetric transition between the two propagation modes within the waveguide.

5. A device according to claim 1, wherein the means for subsequently converting the antisymmetric mode to the symmetric mode comprise two optical transmission waveguides which are substantially parallel over a length $L_2$ and spaced at a distance $d_2$ which does not permit coupling of the two waveguides, and two electrodes extending at the surface of said waveguides and supplied with a direct-current voltage $V_O$ which serves to apply to the waveguides an electric field perpendicular to the surface of the substrate.

6. A device according to claim 1, wherein the means for subsequently converting the antisymmetric mode to the symmetric mode comprise an asymmetric junction having two outputs of different width in which the symmetric mode emerges from the narrowest waveguide.

7. A device according to claim 1, wherein the means for subsequently converting the antisymmetric mode to the symmetric mode comprise two crossed waveguides having the shape of an X and two electrodes located on the crossover point of said X in order to receive a control voltage $V_1$ which makes it possible to direct the symmetric mode into only one of these waveguides.

8. A device according to claim 1, comprising means connected to each end of the microwave propagation line formed by the electrodes deposited on the substrate in order to supply said line with a backward wave and a forward wave.

9. A device according to claim 1, comprising means for supplying the electrodes simultaneously with the microwave signal at the frequency F and with a direct-current voltage $V_O$ which makes it possible to vary the coupling between the two waveguides and consequently the operating frequency of the device.

* * * * *